United States Patent [19]

Sheer et al.

[11] Patent Number: 5,419,864
[45] Date of Patent: May 30, 1995

[54] PROCESS FOR ENCAPSULATING INSERTS WITH WET-LAID MATERIAL VIA COMPRESSION MOLDING

[75] Inventors: M. Lana Sheer, Kennett Square, Pa.; Lloyd Fox, North East, Md.; John C. Solenberger, Wilmington, Del.

[73] Assignee: E. I. Du Pont de Nemours and Company, Wilmington, Del.

[21] Appl. No.: 117,845

[22] Filed: Sep. 7, 1993

Related U.S. Application Data

[63] Continuation-in-part of Ser. No. 700,687, May 15, 1991, abandoned.

[51] Int. Cl.$^6$ .............................................. B29C 70/70
[52] U.S. Cl. ................................ 264/254; 264/255; 264/257; 264/258; 264/272.11; 264/272.19
[58] Field of Search .............. 264/510, 511, 516, 545, 264/250, 254, 255, 272.11, 272.15, 272.19, 257, 258

[56] References Cited

U.S. PATENT DOCUMENTS

| | | | |
|---|---|---|---|
| 1,883,704 | 10/1932 | Goodwin. | |
| 3,147,324 | 9/1964 | Ward | 264/254 |
| 4,632,798 | 12/1986 | Eickman et al. | 264/272.17 |
| 4,861,653 | 8/1989 | Parrish | 428/288 |
| 4,891,176 | 1/1990 | Drysdale et al. | 264/250 |
| 4,986,545 | 1/1991 | Sullivan | 273/235 |
| 5,036,580 | 8/1991 | Fox et al. | 29/605 |

FOREIGN PATENT DOCUMENTS

| | | |
|---|---|---|
| 0254363 | 1/1988 | European Pat. Off. . |
| 0341977 | 11/1989 | European Pat. Off. . |
| 0375851 | 7/1990 | European Pat. Off. . |
| 0403688 | 12/1990 | European Pat. Off. . |
| 1031084 | 5/1966 | United Kingdom . |

*Primary Examiner*—Catherine Timm

[57] ABSTRACT

A compression molding process for encapsulating a metal-containing insert with at least one layer of a thermoplastic sheet prepared via a wet lay process. The thermoplastic sheet material contains a thermoplastic polymeric material and a glass fiber material, and the compression molding process includes the steps of (a) heating the thermoplastic sheet material to a temperature above the melting point of the thermoplastic polymeric material;

(b) placing the heated thermoplastic sheet material into the bottom of a mold on a compression molding die assembly, the mold having been heated to a temperature just above the melting point of the thermoplastic polymeric material;

(c) fastening the metal-containing insert to an unheated upper punch of the compression molding die assembly, such that a part of the metal-containing insert is exposed for encapsulation;

(d) lowering the upper punch into the mold of the compression molding die assembly until the metal-containing insert is forced into the heated thermoplastic sheet material;

(e) applying 500–3,000 pounds per square inch of pressure to the old while lowering the old temperature to below the melting point of the thermoplastic polymeric material, at which time the pressure is reduced to 0 pounds per square inch;

(f) repeating the process of steps (a)–(e) for the unencapsulated parts of the metal-containing insert until the entire metal-containing insert is encapsulated with the thermoplastic sheet material; and (g) optionally sealing any parting line resulting from the compression molding process by caulking with an elastomeric material, welding by ultrasound, or heating by induction.

9 Claims, 3 Drawing Sheets 5,419,864

PROCESS FOR ENCAPSULATING INSERTS WITH WET-LAID MATERIAL VIA COMPRESSION MOLDING

CROSS REFERENCE TO RELATED APPLICATION

This application is a continuation-in-part of abandoned prior U.S. application Ser. No. 07/700,687, filed on May 15, 1991 and entitled Inserts Encapsulated With a Thermoplastic Sheet Material Via Multi-Stage Compression Molding.

BACKGROUND OF THE INVENTION

This invention relates to inserts, particularly electrically functional devices containing metal, such as transformers, sensors, solenoids, motors, relays, electrical connectors, antennas, and circuit boards, that are encapsulated with at least one layer of a thermoplastic sheet material via a compression molding process.

Inserts have been encapsulated in the past with polymeric resins for reasons of environmental protection, thermal conductivity, electrical insulation, shielding, and protection against chemicals. Such encapsulation is usually done via extrusion and injection molding processes (for example, U.S. Pat. No. 4,632,798—Eickman). The resultant encapsulated inserts are, in some cases, and especially if the inserts are electrical in nature, exposed to heat for long periods of time. It has been found that in some cases, the encapsulating layer of such encapsulated devices can crack extensively during exposure to this heat or during thermal cycling. It is believed that this cracking of the encapsulation layer occurs because of differences in the coefficient of thermal expansion, resin shrinkage, or inadequate mechanical properties, each of which could be due to fiber attrition in the resin and/or resin degradation that could occur during extrusion and/or injection molding operations.

It was an object of the present invention to develop an encapsulated insert that does not experience extensive, preferably even slight, visual cracking during thermal cycling. In the present invention, it was found that such an encapsulated insert could be prepared. More specifically, it was found that such an insert could be prepared by using at least one layer of a thermoplastic sheet material to encapsulate the insert and further by encapsulating the insert via a compression molding process.

Any insert can be encapsulated via the compression molding processes described herein using the thermoplastic sheet material described herein. Examples of inserts to which the present invention is particularly applicable include metal-containing, electrically functional devices, such as transformers and parts thereof, solenoids, sensors, motors, relays, electrical connectors, antennas, and circuit boards, and other metal devices that are exposed to heat for extended periods of time or that undergo thermal cycling.

SUMMARY OF THE INVENTION

This invention relates to inserts encapsulated, by compression molding processes, in at least one layer of a thermoplastic sheet material. The resultant insert does not experience significant visible cracking during thermal cycling. The present invention is particularly useful in making encapsulated electrical devices Which contain metal, such as transformers, solenoids, sensors, circuit boards, and other devices that are exposed to heat for extended periods of time or that undergo thermal cycling.

DETAILED DESCRIPTION OF THE INVENTION

Figure 1:
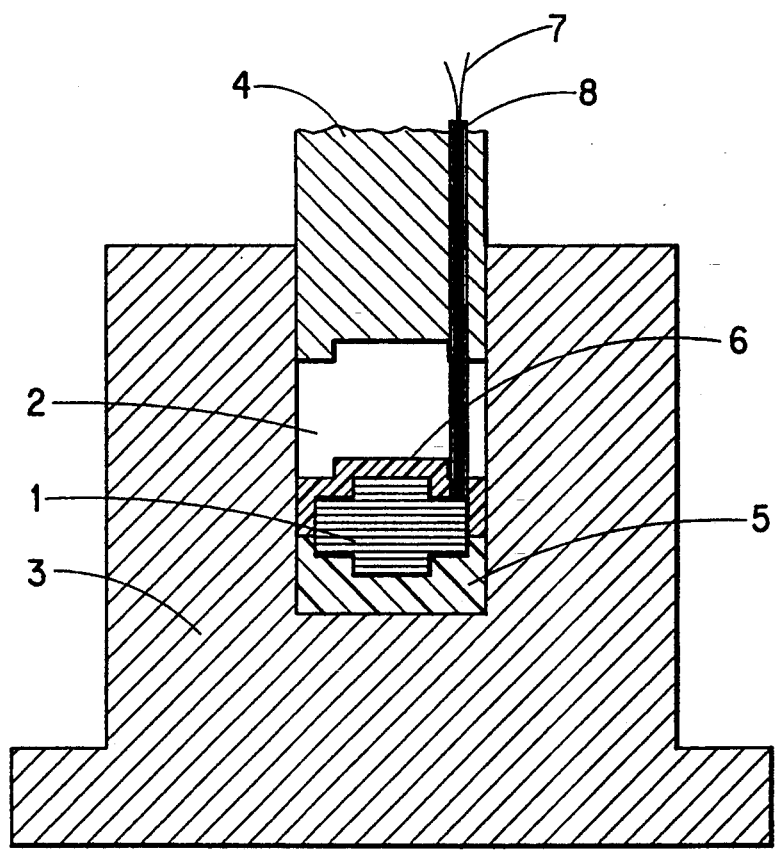
FIGS. 1-2 depict the first and second stages of encapsulating an insert by compression molding, the insert being a transformer.

In the present invention, an insert is encapsulated via the compression molding processes described herein using at least one layer of a thermoplastic sheet material prepared via a wet lay process.

The thermoplastic sheet material used herein is prepared from a thermoplastic polymer material and it contains 5–55 weight percent, preferably 10–50 weight percent, of a glass fiber material. The preceding weight percents are based upon the weight of the thermoplastic polymeric material and the glass fiber material only.

The thermoplastic polymeric material used in the thermoplastic sheet material can be in various forms, such as fibers, pellets, flakes, or disc-refined pulps. Useful thermoplastic polymer materials include polyesters (preferably polyethylene terephthalate), polyamides, acrylics, thermoplastic elastomers or rubbers (such as copolyetheresters, an example of which is Hytrel ®, manufactured by DuPont, partially cross-linked halogenated polyolefin alloys compounded with plasticizers and stabilizers, an example of which is Alcryn ®, manufactured by DuPont), polyolefins (such as polypropylene), and mixtures of any of the above.

The glass fiber material used in the thermoplastic sheet material can be comprised of glass fibers only or can be a mixture of fibers, flakes, or spheres, provided that glass fiber is present in the glass material. Preferably, it is comprised of greater than 70 weight percent glass fibers, said fibers having a length greater than ⅛ of an inch. Most preferably, it is comprised of greater than 90 weight percent glass fibers, said glass fibers having a length greater than ⅛ of an inch.

In addition to the thermoplastic polymeric material and the glass fiber material, the thermoplastic sheet material can contain other additives, such as antioxidants, flame retardants, viscosity modifiers, aramid fibers, UV stabilizers, thermal stabilizers, and/or tougheners.

If it is desired that an encapsulation layer around the insert be electrically insulating, then it is preferred that the insert be encapsulated with at least one layer of a thermoplastic sheet material that is prepared from polyethylene terephthalate fiber (an example of which is Dacron ®) and that contains 5–55 weight percent, preferably 10–50 weight percent, glass fiber.

If it is desired that an encapsulation layer around the insert be thermally conductive, then the insert should be encapsulated with at least one layer of a thermoplastic sheet material that additionally contains 5–60 weight percent, preferably 10–45 weight percent, of at least one thermally conductive material, such as carbon fibers, metal coated carbon fibers, metal powders, metal fibers, graphitized petroleum coke particles, carbon black, carbon powder, or mixtures thereof. The preferred thermally conductive thermoplastic sheet material contains 30–45 weight percent polyethylene terephthalate fiber, 5–35 weight percent glass fiber, and about 15–50 weight percent of at least one thermally conductive material selected from the group consisting of petroleum coke particles graphitized at greater than 2500° C. and carbon fiber that is centrifugally spun from a mesophase pitch (as described in U.S. Pat. No. 4,861,653, the disclosures of which are incorporated herein by reference).

As stated above, the insert can be encapsulated with one or more layers of the same or varying thermoplastic sheet material. For electrical devices, and in particular for transformers, it is recommended that the insert be encapsulated with at least one layer of a thermally conductive thermoplastic sheet material and at least one layer of an electrically insulating thermoplastic sheet material, said at least one layer of an electrically insulating thermoplastic sheet material being adjacent to, and in direct contact with, the outer surface of the insert to be encapsulated. The thermally conductive thermoplastic sheet material is preferably the outer most encapsulating layer. See U.S. Pat. No. 5,236,779 issued on Aug. 17, 1993.

The wet lay thermoplastic sheet material, or a preform thereof, is generally prepared (as described in European Patent Application 0341977) by dispersing the components of said thermoplastic sheet material in water to form a slurry which is then drained, dewatered, and dried. The dispersion is carried out in a conventional papermakers pulper using water at a pH of 5.5 to 8.5 and at a consistency of 0.25% to 2% by weight solids. A good dispersion can be carried out by either co-dispersing or by first dispersing the thermoplastic polymer material followed by the glass fiber material.

The wet lay thermoplastic sheet material, or a preform thereof, is formed on conventional papermaking equipment where the forming section of the machine is preferably of the type known as inclined wire, i.e., the slurry is drained through a forming wire which is inclined at an angle (usually 15 to 45 degrees) into the forming slurry. Such equipment is specifically designed to be capable of forming fibrous mats at moderate to high slurry dilutions. However, other machine styles can be used as well, such as cylinder formers and others. Sheet drying can be accomplished via a combination of thru-air drying, contact drying, infrared or radiant heat. The maximum temperature reached by the fibrous mat must be sufficient to activate "tacking" of a suitable fraction of the thermoplastic polymer material to achieve sufficient mat strength for good processability. See European Patent Application 0341977.

The preferred wet lay thermoplastic sheet material is prepared by co-dispersing the thermoplastic polymer material and the glass fiber material in a conventional papermakers pulper, followed by deposition on a wire, dewatering, drying, and heating to a temperature sufficient to activate "tacking" of the thermoplastic polymer material, optionally light calendaring the sheet, and winding it on a mandrel.

In the present invention, encapsulation of the insert in the thermoplastic sheet material can be accomplished via a multi-stage compression molding process. In the first stage, one part of the insert is encapsulated by a compression molding process and in the subsequent stages, the other parts of the insert are encapsulated by a compression molding process until the entire part is encapsulated. Preferably, the entire encapsulation process is completed by encapsulating the top part of the insert and then encapsulating the bottom part of the insert in a second compression molding operation. However, depending upon the complexity of the insert being encapsulated, it should be understood that more than two compression molding operations may be required for full encapsulation.

Figure 2:
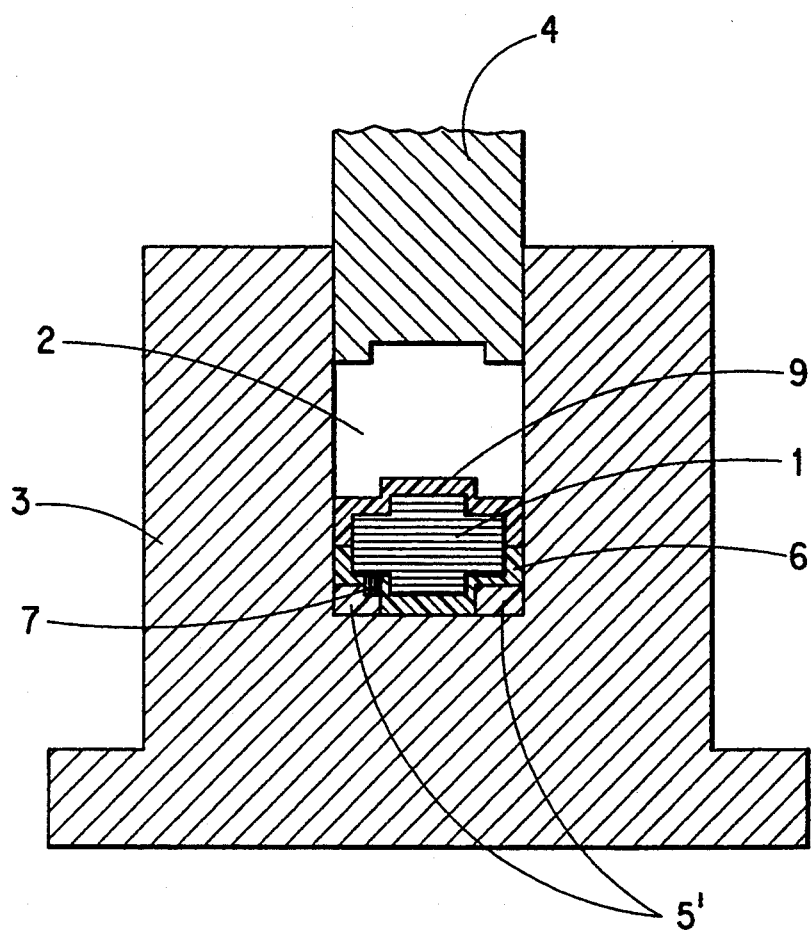

An example of the compression molding process is described more specifically by reference to FIG. 1 and FIG. 2. FIG. 1 shows the first part encapsulation for an insert that is a transformer. In FIG. 1, the insert (1) (i.e., the transformers) would be inserted into the mold cavity (2) of a compression molding die assembly having a mold (3) and an upper punch (4). The part of the insert that is not to be encapsulated during the first part encapsulation would be isolated from the compression molding operation by an isolation insert (5).

If the insert being encapsulated contains exposed wires (7), as in the case of a transformer, then it is recommended that the exposed wires be protected from the encapsulation operation by a hollow slide (8) that is standard in the industry. After the first stage encapsulation is complete, the hollow slide would be retracted toward the punch; it can be replaced by a non-conductive wire holder that would serve to isolate the wiring from any encapsulating material that is conductive. The enclosed wiring then would serve as the base for external electrical connections.

In addition, the insert, or parts thereof, can be protected by any electrically insulating tape or film such as polyethylene terephthalate film and polyimide film (e.g., Mylar ® and Kapton ®, both manufactured by DuPont).

The thermoplastic sheet material (6) (or a preform thereof, as discussed below) would be placed over the exposed part of the insert to be encapsulated. Enough material should be used to encapsulate the entire exposed part of the insert. The thermoplastic sheet material, or a preform thereof, would optionally, and preferably be heated in an external oven to above the melting point, but below the point of degradation, of the thermoplastic polymer material in the thermoplastic sheet material before being placed over the insert to be encapsulated. The temperature of the mold would be kept near, but not above, the melt temperature of the thermoplastic polymeric material in the thermoplastic sheet material. The insert to be encapsulated is preferably not pre-heated. The mold would then be closed off by lowering the upper punch (4) completely into the mold cavity (2), thereby forcing the thermoplastic sheet material around the exposed surfaces of the insert. Pressure in the mold would be raised to 500–3,000 pounds per square inch, with 500–1,000 pounds per square inch being preferred. The mold temperature would then be lowered to below the melting point of the thermoplastic polymeric material in the thermoplastic sheet material, after which time, molding pressure would be lowered to 0 pounds per square inch and the upper punch would be raised above the mold. The time needed to complete this encapsulation step, from the time the thermoplastic sheet material, or preform thereof, is placed over the insert until the upper punch is raised would be about 5–20 minutes.

Instead of using the thermoplastic sheet material as is, it is preferred to use a preform of the thermoplastic sheet material. A preform is preferred because it has only 10%–20% of the bulk density of the thermoplastic sheet material. A preform of the thermoplastic sheet material, which can be one layer or, more commonly, multi-layered, can be made in the form of a flat plate, said plate being either partially or fully consolidated by pressing the thermoplastic sheet material in an earlier operation. Alternatively, a preform can be formed into either the full or partial shape of the insert to be encapsulated. In such a case, such partially or fully formed preforms are prepared by heating and pressing the thermoplastic sheet material in an earlier operation.

After the insert has been encapsulated as described above for the first stage encapsulation, it would then be turned over in the mold cavity, the isolation insert (5) would be removed from the compression molding die assembly and replaced by one adapted to the partly encapsulated insert (5'), and another part of the insert would be encapsulated by the same process described above. This second stage encapsulation process is shown in FIG. 2. (Structures in FIG. 2 that are numbered the same as in FIG. 1 are meant to represent the same structure as in FIG. 1.) In FIG. 2, the first stage encapsulation is shown by (6) and the second stage encapsulation is shown by (9).

The traditional way to encapsulate an insert via compression molding techniques is to place the insert in the mold cavity, place the encapsulating material (or preform thereof) around the insert, close the mold, and apply heat until the encapsulation process is complete. Such a process is acceptable but there is always a desire, especially with metal-containing electrical devices such as transformers, to reduce the residence time of an insert in a hot mold because it is possible that the function of the insert may be damaged if exposed to excessive heat during encapsulation.

Figure 3:
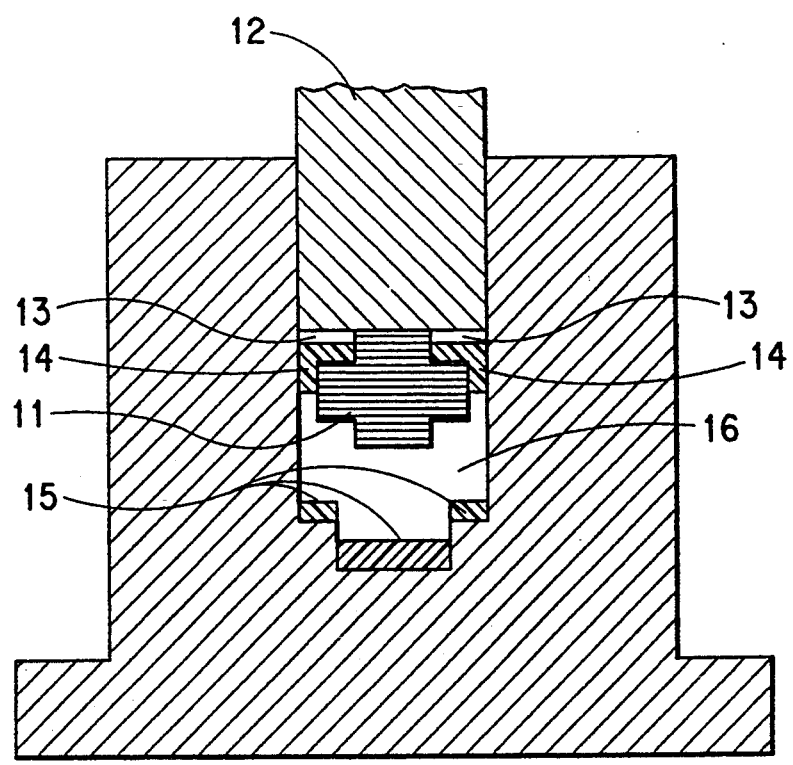
FIG. 3 shows a second embodiment of the process.

In another embodiment of the present invention, it has been found that the residence time of the insert in the mold during the encapsulation/compression molding operation can be reduced by following the procedure illustrated in FIG. 3. In FIG. 3, the insert to be encapsulated (11) would be fastened to the end of an unheated punch (12) (as opposed to putting the device in the mold cavity) of a compression molding assembly. The insert can be fastened to the punch with, for example, bolts (13). It is preferable that the insert not be heated. Isolation inserts (14) can be attached to the punch to prevent encapsulation of selected parts of the insert. The thermoplastic sheet material (15), or a preform thereof, would be preferably preheated in an external oven as described above and would be placed in the bottom of the mold cavity (16). The mold would be preferably pre-heated to just above the melting point of the thermoplastic polymeric material in the thermoplastic sheet material. The insert fastened to the unheated upper punch would then be forced down into the mold containing the thermoplastic sheet material (or preform thereof). The molding pressure would then be raised to 500–3,000 pounds per square inch, with 500–1,000 pounds per square inch being preferred. The mold temperature would then be dropped to below the melting point of the thermoplastic polymeric material used in the thermoplastic sheet material and the mold pressure would be dropped to 0 psi. The punch would then be lifted out of the mold cavity to remove the partly encapsulated insert. Other parts of the insert would be encapsulated by the same process. By this procedure, the residence time of the insert in the heated mold is about 1–3 minutes per part (versus 10–20 minutes when the insert is placed directly in the mold and the thermoplastic sheet material is placed over the insert).

In yet a third embodiment of the present invention, it is possible to encapsulate an insert in a single step. In this embodiment, the mold is constructed in two segments, a first mold segment and a second mold segment, positioned opposite each other in the press. The two mold segments are heated to just above the melting point of the thermoplastic polymeric material in the thermoplastic sheet material. At least two thermoplastic sheets, or preforms thereof, are preheated in an external oven to above the melting point but below the point of degradation of the thermoplastic polymeric material in the thermoplastic sheets or preforms. Metal-containing inserts to be encapsulated are preferably not preheated. At least one, but not all, of the heated thermoplastic sheets or preforms is then placed in the heated first mold segment. Next, the unheated insert is placed adjacent to the thermoplastic sheet or preform in said heated first mold segment such that the heated thermoplastic sheet or preform lay between said heated first mold segment and the unheated insert. At least one other heated thermoplastic sheet or preform is then placed between the unheated insert and the heated second mold segment such that the unheated insert is positioned between the heated thermoplastic sheets or preforms in the first and second mold segments. The two mold segments are then closed until the two mold segments are mated, thereby forcing the thermoplastic sheet material, or preform thereof, around the exposed surfaces of the insert. Isolation inserts may be used to prevent encapsulation of selected parts of the metal insert to be encapsulated. The pressure in the mold segments is raised to 500–3,000 pounds per square inch, with 500–1,000 pounds per square inch being preferred. The mold temperature would then be lowered to below the melting point of the thermoplastic polymeric material used in the thermoplastic sheet material, after which the molding pressure would be lowered to 0 pounds per square inch and the two mold segments separated. The time to complete encapsulation from the time the thermoplastic sheet materials or preforms and the insert is placed between the mold segments until the mold segments are separated would be about 1–2 minutes.

The insert can be encapsulated by any of the procedures described above more than once. The procedure can be repeated to apply more of the same, or different, layers of thermoplastic sheet material. Alternatively, more than one layer of identical, or varying, thermoplastic sheet materials can be applied in a single molding operation by placing more than one layer of the same, or varying, thermoplastic sheet material on the insert to be encapsulated in the .mold cavity or by making a preform from more than one layer of the same, or varying, thermoplastic sheet materials.

In instances where the insert is encapsulated, via a multi-stage compression molding process, and since the first part encapsulation is not remelted during subsequent encapsulations, there may be a parting line between the various encapsulation/compression molding stages. The parting line can be sealed by caulking with an elastomeric material, using ultrasonic welding, or heating by induction. Sealing of the parting line provides a weather barrier and further permits the sealed parting line to act as an expansion joint between the encapsulated parts of the transformer. Alternatively, the mold in the compression molding die assembly can be designed so that the parting line between encapsulations is in the form of a tongue and groove, wherein the tongue is in the shape of a thin point that can melt easily and help seal the resultant parting line.

EXAMPLES

The components of the compositions of Examples C1–C7 and 1 are given in TABLE I, below.

The compositions of Examples C1–C7 were prepared as follows: the PET resin was dried at 100° C. and −18° C. dew point for about 2 hours. The PET resin was dry blended with the other ingredients listed in TABLE I and then extruded in a twin screw extruder having cylinder temperatures set between 260° C.–300° C. The temperature of the melt as it exited the die ranged between 280° C.–300° C. The final product was chopped and dried at 100° C. and −18° C. dew point for about 2 hours.

The thermoplastic sheet material of Example 1 was prepared from 45% PET (Dacron®) fibers, 10% glass fibers, and 45% of the carbon fibers described in U.S. Pat. No. 4,861,653. The thermoplastic sheet material was prepared, and formed into a multi-layer preform, as described above.

The compositions of Examples C1–C7 were used to encapsulate a hollow cylinder having ½" inner diameter, 1" outer diameter, and 1⅜" length. The cylinder was encapsulated on its ends and outside surface with a 1/16" layer of resin. Encapsulation for Examples C1–C7 was carried out by the following injection molding process: The extruded composition was dried at 100° C. and −18° C. dew point for about 2 hours. It was then loaded into a standard, general purpose, gradual compression screw injection molding machine. The injection machine had a cylinder temperature setting of 260° C.–295° C., a mold temperature setting of 93° C., and an injection pressure of 10–16,000 psi. The temperature of the melt was 280° C.–300° C.

Each encapsulated metal cylinder was heated to about 200° C. and held at that temperature for 3 hours. The encapsulated melt cylinder was then cooled to room temperature and held at that temperature for 6 hours. The cycle was then repeated 4 more times. The test was considered a success if no visible cracking was observed at the end of five cycles. TABLE I indicates the cycle at which cracking was visible for cylinders encapsulated with the compositions of Examples C1–C7.

The thermoplastic sheet material of Example 1 was used to encapsulate a steel circular insert, shaped like a hockey puck, having 1⅞" outer diameter and 1" length. The insert was encapsulated with a 3/16" layer of the thermoplastic sheet material described above. Encapsulation was accomplished by the following multi-stage compression molding process: the mold of a standard compression molding die assembly was heated to 250° C. The thermoplastic sheet material, which was in the shape of a preform, was heated to 270° C. in an external oven and placed in the bottom of the hot mold. The steel insert, which was not heated, was placed in the mold. Isolation inserts were placed over the top part of the insert so that only the bottom half of the insert would be encapsulated. The insert was pressed into the hot thermoplastic sheet material, thereby forcing the thermoplastic sheet material up and around the insert until it reached the isolation inserts. The molding pressure was 1,000 psi. The mold was then cooled to below 200° C., with pressure being maintained at 1,000 psi. When the temperature was below 200° C., the pressure was then dropped to 0 psi, the mold wad dismantled, and the partially encapsulated insert was removed. The mold was then reheated to 250° C. The thermoplastic sheet material, again in the shape of a preform was heated to 270° C. and placed in the mold. The encapsulated part of the partially encapsulated insert was placed in mold, with the encapsulated part of the insert acting as an integral isolation insert. The insert was pressed into the thermoplastic sheet material using a pressure of 1,000 psi. The resin was forced up and around the insert until it reached the previously encapsulated surface. The mold was then cooled to 200° C., the pressure was dropped to 0 psi, the mold was dismantled, and the fully encapsulated insert was removed.

The compression-molded, encapsulated cylinder of Example 1 was heat cycled as described above. No cracking was visible after 5 cycles.

TABLE 1

| Example Number | Thermoplastic Material | Wt. % Glass (Type) | Wt. % Other Additive | Oven Temperature (°C.) | Failure |
| --- | --- | --- | --- | --- | --- |
| C1 | PET Resin | — | — | 200 | Cycle 2 |
| C2 | PET Resin | 15% (Fiber) | 9% EBAGMA 2.5% TPA | 200 | Cycle 5 |
| C3 | PET Resin | — | 9% EBAGMA | 200 | Cycle 5 |
| C4 | PET Resin | 15% (Micro Fiber) | — | 200 | Cycle 3 |
| C5 | PET Resin | 25% (Micro Fiber) | — | 200 | Cycle 1 |
| C6 | PET Resin | 5% Fiber 10% Flake | — | 200 | Cycle 1 |
| C7 | PET Resin | 10% Fiber 20% Flake | — | 200 | Cycle 1 |
| 1 | PET Fiber | 10% Fiber | 45% carbon Fiber[a] | 200 | None |

PET = polyethylene terephthalate; EBAGMA = terpolymer of ethylene/butyl acrylate/glycidyl methacrylate; TPA = oligomer of terephthalic acid; [a]Prepared as in U.S. Pat. No. 4,861,653.

What is claimed is:

1. A compression molding process for encapsulating an electrically functional device with at least one layer of a thermoplastic sheet material prepared via a wet lay process, said thermoplastic sheet material comprising a thermoplastic polymeric material selected from the group consisting of polyesters, polyamides; acrylics, copolyetheresters, polyolefins and mixtures thereof and 10–50 weight percent of a glass fiber material; said compression molding process comprising the steps of
   (a) heating the thermoplastic sheet material to a temperature above the melting point of the thermoplastic polymeric material;
   (b) placing the heated thermoplastic sheet material into the bottom of a mold on a compression molding die assembly, said mold having been heated to a temperature just above the melting point of the thermoplastic polymeric material;
   (c) fastening the electrically functional device to an unheated upper punch of the compression molding die assembly such that a part of the electrically functional device is exposed for encapsulation;

(d) lowering the upper punch into the mold of the compression molding die assembly until the electrically functional device is forced into the heated thermoplastic sheet material;

(e) applying 500–3,000 pounds per square inch of pressure to the mold while lowering the mold temperature to below the melting point of the thermoplastic polymeric material, at which time the pressure is reduced to 0 pounds per square inch;

(f) repeating the process of steps (a)–(e) for the unencapsulated parts of the electrically functional device until the entire electrically functional device is encapsulated with the thermoplastic sheet material; and (g) optionally sealing any parting line resulting from the compression molding process by caulking with an elastomeric material, welding by ultrasound, or heating by induction.

2. The process of claim 1 wherein step (a), the thermoplastic sheet material is in the form of a multi-layer preform.

3. A compression molding process for encapsulating an electrically functional device with at least one layer of a thermoplastic sheet material prepared via a wet lay process, said thermoplastic sheet material comprising a thermoplastic polymeric material selected from the group consisting of polyesters, polyamides, acrylics, copolyetheresters, polyolefins and mixtures thereof and 10–50 weight percent of a glass fiber material; said compression molding process comprising the steps of (a) placing the electrically functional device in the bottom of a compression molding die assembly cavity, equipped with a mold and an upper punch, such that one part of the electrically functional device is exposed for encapsulation and the remaining part of the electrically functional device is protected from encapsulation by one or more isolation inserts, (b) heating the thermoplastic sheet material to a temperature above the melting point of the thermoplastic polymeric material and arranging the heated thermoplastic sheet material over the part of the electrically functional device to be encapsulated, (c) heating the mold to slightly above the melt temperature of the thermoplastic polymeric material, (d) closing the mold cavity by lowering the punch completely into the cavity and the mold, (e) applying 500–3,000 pounds per square inch of pressure to the mold while lowering the molding temperature to below the melting point of the thermoplastic polymeric material, at which time, pressure is reduced to 0 pounds per square inch, (f) repeating the process of steps (a)–(e) for the parts of the electrically functional device that are not encapsulated until the entire electrically functional device is encapsulated, and (g) optionally sealing any parting line resulting from the compression molding process by caulking with an elastomeric material, welding by ultrasound, or heating by induction.

4. The process of claim 3 wherein step (b), the thermoplastic sheet material has been preheated to a temperature above the melting point and below the degradation point of the thermoplastic polymeric material contained therein.

5. The process of claim 3 wherein step (b), the thermoplastic sheet material is in the shape of a multi-layer preform.

6. The process of claim 1 or claim 3 wherein the mold is designed so that any parting line on the encapsulated electrically functional device resulting from the compression moldings is in the form of a tongue and groove, with said tongue being in the shape of a thin point.

7. A compression molding process for encapsulating an electrically functional device with at least two layers of a thermoplastic sheet prepared via a wet lay process, said thermoplastic sheet comprising a thermoplastic polymeric material selected from the group consisting of polyesters, polyamides, acrylics, copolyetheresters, polyolefins and mixtures thereof and 10–50 weight percent of a glass fiber material; said compression molding process comprising the steps of (a) heating at least two thermoplastic sheets or preforms thereof to a temperature above the melting point of the thermoplastic polymeric material;

(b) heating a first mold segment and a second mold segment to a temperature just above the melting point of the thermoplastic polymeric material in the thermoplastic sheets or preforms, said first and second mold segments being positioned opposite each other in a press;

(c) placing at least one, but not all, of the heated thermoplastic sheets or preforms in said heated first mold segment;

(d) placing the electrically functional device adjacent to the at least one heated thermoplastic sheet or preform in the heated first mold segment such that said at least one heated thermoplastic sheet or preform lay between said heated first mold segment and said electrically functional device;

(e) placing at least one other heated thermoplastic sheet or preform between the electrically functional device and the heated second mold segment such that the electrically functional device is positioned between said at least two heated thermoplastic sheets or preforms;

(f) closing said first and second mold segments together until said mold segments are mated;

(g) applying 500–3,000 pounds per square inch of pressure to the mold while lowering the mold temperature to below the melting point of the thermoplastic polymeric material, at which time the pressure is reduced to 0 pounds per square inch; and (h) separating said first and second mold segments and removing an encapsulated electrically functional device from the mold.

8. The process of any one of claims 1, 3, or 7, wherein the electrically functional device is encapsulated with (a) at least one layer of thermoplastic sheet material comprising PET fiber and 10–50 weight percent glass fiber, said at least one layer of thermoplastic sheet material being adjacent to, and in direct contact with, the surface of the electrically functional device to be encapsulated, and (b) at least one layer of thermoplastic sheet material containing at least one thermally conductive material.

9. The process of claim 8 wherein the thermally conducting material is selected from the group consisting of graphitized petroleum coke particles, carbon fiber centrifugally spun from a mesophase pitch, and mixtures thereof.

* * * * *